(12) United States Patent
Saito et al.

(10) Patent No.: US 7,434,077 B2
(45) Date of Patent: Oct. 7, 2008

(54) POWER CONTROL APPARATUS, ELECTRONIC APPARATUS, AND PORTABLE COMMUNICATIONS TERMINAL

(75) Inventors: Masatoshi Saito, Kanagawa (JP); Tomonori Tsuchiyama, Kanagawa (JP)

(73) Assignees: Sony Ericsson Mobile Communications Japan, Inc., Tokyo (JP); Sony Corporation, Tokyo (JP)

( * ) Notice: Subject to any disclaimer, the term of this patent is extended or adjusted under 35 U.S.C. 154(b) by 496 days.

(21) Appl. No.: 11/107,803

(22) Filed: Apr. 18, 2005

(65) Prior Publication Data

US 2005/0240789 A1 Oct. 27, 2005

(30) Foreign Application Priority Data

Apr. 21, 2004 (JP) ............................. 2004-125833

(51) Int. Cl.
*G06F 1/00* (2006.01)
(52) U.S. Cl. ....................................... 713/340; 716/19
(58) Field of Classification Search ................. 713/340; 716/19
See application file for complete search history.

(56) References Cited

U.S. PATENT DOCUMENTS

| | | | | |
|---|---|---|---|---|
| 5,892,942 A | * | 4/1999 | Ohnishi et al. ............... 713/1 |
| 6,040,722 A | * | 3/2000 | Lee ............................. 327/143 |
| 6,173,436 B1 | * | 1/2001 | Ciccone et al. ............... 716/19 |
| 6,581,158 B1 | * | 6/2003 | Plourde ........................ 713/1 |
| 6,842,864 B1 | * | 1/2005 | Barth et al. .................. 713/401 |
| 2004/0095116 A1 | | 5/2004 | Kernahan et al. | |
| 2006/0005060 A1 | * | 1/2006 | Bibikar et al. .............. 713/330 |

FOREIGN PATENT DOCUMENTS

| | | |
|---|---|---|
| EP | 0 532 790 A1 | 3/1993 |
| JP | 62-210521 | 9/1987 |
| JP | 4-31981 | 2/1992 |

* cited by examiner

*Primary Examiner*—Chun Cao
*Assistant Examiner*—Vincent T Tran
(74) *Attorney, Agent, or Firm*—Oblon, Spivak, McClelland, Maier & Neustadt, P.C.

(57) ABSTRACT

A voltage detector detects a start of power supply from a battery. When the voltage detector detects the start of power supply, a counter starts counting the clocks of an RTC. A first comparator compares a count value stored in a first non-volatile memory and the count value of the counter and outputs a CPU reset release signal when these count values match with each other. A second comparator compares a count value N stored in a second non-volatile memory and the count value of the counter and, when these count values coincide with each other, performs power-on operation of a regulator which outputs I/O power for the CPU. Accordingly, timing of CPU reset release and timing of regulator power-on can be readily modified without aluminum modification.

15 Claims, 4 Drawing Sheets

FIG. 4

POWER CONTROL APPARATUS, ELECTRONIC APPARATUS, AND PORTABLE COMMUNICATIONS TERMINAL

CROSS REFERENCE TO RELATED APPLICATIONS

The present document is based on Japanese Priority Document JP2004-125833, filed to the Japanese Patent Office on Apr. 21, 2004, the contents of which being incorporated herein by reference.

BACKGROUND OF THE INVENTION

1. Field of the Invention

The present invention relates to a power control apparatus which supplies power to a CPU (Central Processing Unit) and other constituent elements after performing reset release of the CPU at the time of power-on, an electronic apparatus equipped with such power control apparatus, and a portable communications terminal equipped with such power control apparatus.

2. Description of Related Art

In an electronic apparatus which performs operation control of devices and the like by means of a CPU, a power management IC has heretofore performed reset release of the CPU and control of the power-on of a regulator at the time of power-on, for example, at the time of attachment of a battery to the electronic apparatus or at the time of connection of the electronic apparatus to a power receptacle. Specifically, at the time of power-on, when the power management IC detects that a voltage value after power-on has become not less than a predetermined voltage value, the power management IC, after the lapse of a predetermined set time of a built-in delay circuit, performs reset release of the CPU and further causes the regulator to power-on so as to supply I/O power to an internal memory and the like of the CPU.

Japanese Laid-Open Patent Application No. HEI9-44468 (Patent Document 1 (FIG. 1)) discloses a control circuit which sets the circuit configuration (logic) of a backup hardware circuit to be managed by a microcomputer, before the start of operation of the microcomputer. In other words, in this control circuit, a non-volatile memory for setting the circuit configuration is provided in its hardware circuit, and the circuit configuration of the hardware circuit is set in accordance with the data stored in the non-volatile memory, before the microcomputer starts operation after power-on. Therefore, according to this control circuit, it is possible to complete the setting of the circuit configuration of the hardware circuit before the start of operation of the microcomputer, whereby it is possible to compatibly realize the prevention of malfunctions in systems and an increase in processing speed.

SUMMARY OF THE INVENTION

In the case of the power management IC of the related art, the set time of the built-in delay circuit is a fixed time, so that if the set time is to be modified, it is necessary to modify an aluminum wiring pattern in the IC (the so-called aluminum modification). Accordingly, if the specifications of the CPU are modified and modification of timing of reset release and timing of power-on is necessary, specification modification such as aluminum modification becomes necessary for the power management IC as well. This fact may constitute a major cause of cost increase of electronic apparatuses and prolonged development time.

In the case of the art described in Patent Document 1, the setting of the circuit configuration of the backup hardware circuit can be completed before reset release of the microcomputer, but the art of Patent Document 1 cannot be used in applications such as modification of timing of reset release of the microcomputer and timing of power-on.

The present invention has been made in view of these circumstances, and provides an electronic control apparatus, an electronic apparatus and a portable communications terminal, all of which having timing of reset release and timing of power-on that can be readily modified without aluminum modification and the like in the case where the specifications of a CPU are modified and modification of timing of reset release and timing of power-on is necessary.

A power control apparatus according to a preferred embodiment of the present invention includes detection means which detects a start of power supply, timing determination means which determines at least one of timing of CPU reset release and timing of I/O power supply to the CPU after the start of power supply is detected, rewritable non-volatile storage means which stores control values for controlling the timing determined by the timing determination means, and rewriting interface means for rewriting the control values stored in the non-volatile storage means.

In the power control apparatus, the non-volatile storage means stores as the control values a first count value for controlling the timing of reset release of the CPU and a second count value for controlling the timing of I/O power supply to the CPU, and the timing determination means includes counting means which starts counting reference clocks after the start of power supply is detected, first comparison means which compares the first count value stored in the non-volatile storage means and a count value output from the counting means, and second comparison means which compares a second count value stored in the non-volatile storage means and the count value output from the counting means. The timing determination means is operative to determine, as the timing of reset release of the CPU, the timing at which the first comparison means detects a coincidence between the first count value of the non-volatile storage means and the count value of the counter, and to determine, as the timing of I/O power supply to the CPU, the timing at which the second comparison means detects a coincidence between the second count value of the non-volatile storage means and the count value of the counting means.

In addition, an electronic apparatus and a portable communications terminal according to the preferred embodiment of the present invention may include the power control apparatus according to the preferred embodiment of the present invention.

In other words, in the preferred embodiment of the present invention, the control values for determining at least one of the timing of reset release of the CPU and the timing of I/O power supply to the CPU are stored in the rewritable non-volatile storage means, whereby merely by rewriting the control values stored in the non-volatile storage means, it is possible to arbitrarily modify at least one of the timing of reset release and the timing of I/O power supply.

As mentioned above, according to the preferred embodiments of the present invention, it is attempted to modify at least one of the timing of reset release and the timing of I/O power supply by rewriting the control values of the non-volatile storage means, whereby if the specifications of the CPU are modified and modification of the timing of reset release and the timing of I/O power supply is necessary, for example, the timing of reset release and the timing of I/O power supply can be readily modified without aluminum modification or the like.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

A power control apparatus, an electronic apparatus and a portable communications terminal according to a preferred embodiment of the present invention will be described below with reference to the accompanying drawings.

[Configuration of Power Management IC]

Figure 1:
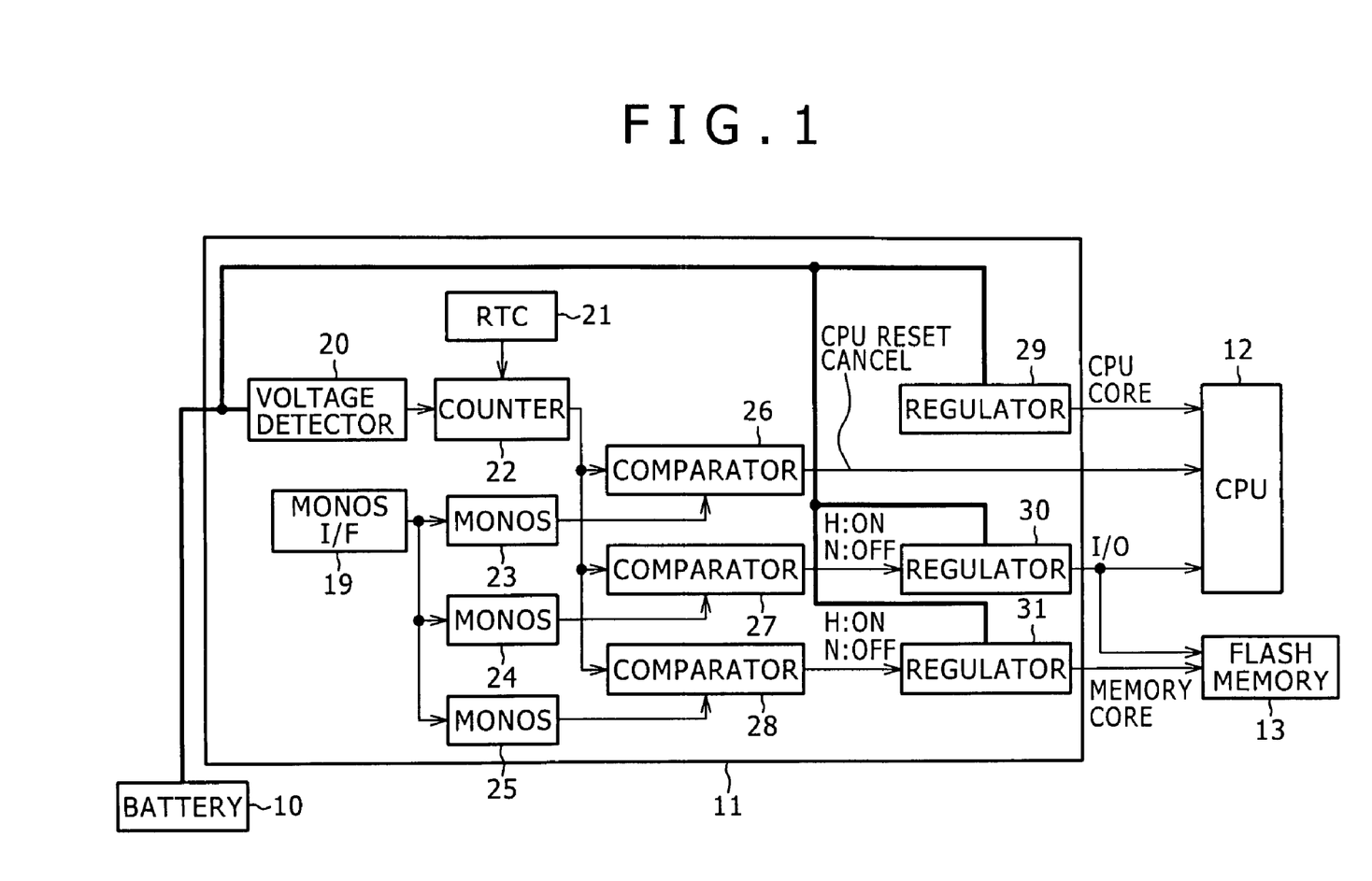
FIG. 1 is a block circuit diagram showing an internal configuration of a power management IC according to a preferred embodiment of the present invention.

FIG. 1 shows an example of configuration which includes a power management IC 11 constituting a power control apparatus according to the preferred embodiment of the present invention, as well as a CPU 12 and a flash memory 13 each of which power is to be supplied to from a battery 10 via the power management IC 11. FIGS. 2A to 2J show operation timing charts of the respective constituent elements shown in FIG. 1.

The battery 10 is a removable battery, for example. In addition, an AC/DC converter which converts AC power to DC power may be used to supply power to the power management IC 11, for example.

Figure 2:
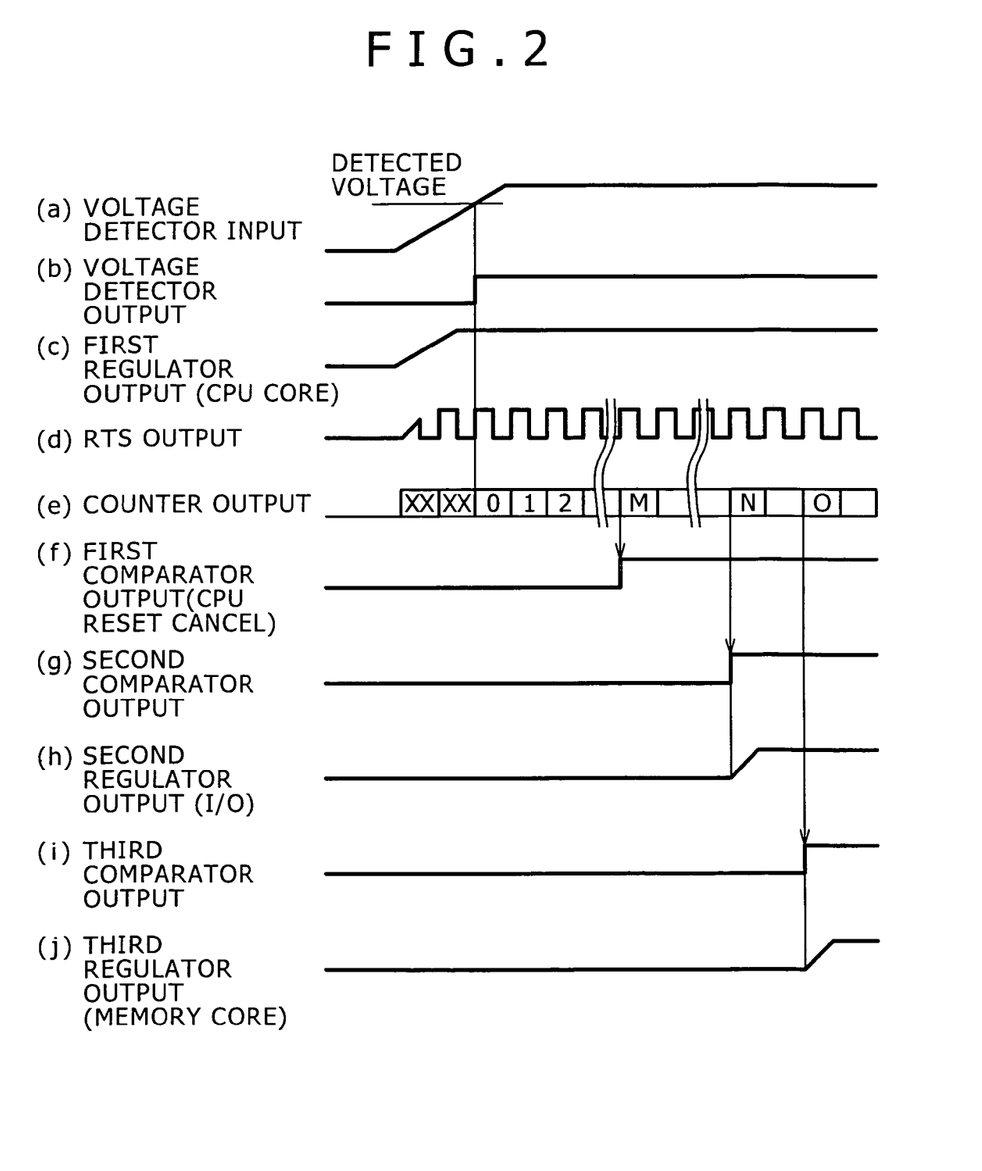
FIGS. 2A to 2J are operation timing charts of respective constituent elements of the power management IC according to the preferred embodiment of the present invention.

In the preferred embodiment of the present invention, when the battery 10 is connected to the power management IC 11, the voltage at the input terminal of a voltage detector 20 of the power management IC 11 starts to increase gradually as shown in FIG. 2A. The voltage detector 20 monitors the voltage value supplied from the battery 10. As shown in FIG. 2B, the voltage detector 20 is held at its L (low) level until the voltage value from the battery 10 reaches a predetermined detected voltage value, and when the voltage value from the battery 10 reaches the predetermined detected voltage, the voltage detector 20 outputs a voltage detection signal which changes to its H (high) level. The voltage detection signal from the voltage detector 20 is sent to a counter 22.

In addition, when the battery 10 is connected to the power management IC 11, a first regulator 29 supplies the predetermined core voltage shown in FIG. 2C to the CPU 12.

A clock generator 21 is a so-called RTC (real-time clock), and when the battery 10 is connected to the power management IC 11, the clock generator 21 starts a clock operation as shown in FIG. 2D. The clock signals outputted from the clock generator 21 are sent to the counter 22.

As shown in FIG. 2E, after the voltage detection signal from the voltage detector 20 has gone to the H level, the counter 22 starts to count the clock signals sent from the clock generator 21. The count signal outputted from the counter 22 is sent to each of a first comparator 26, a second comparator 27 and a third comparator 28.

The first comparator 26 compares a count value M stored in a first MONOS (Metal-Oxide-Nitride-Oxide-Semiconductor) 23, which is a rewritable non-volatile memory, and the count value sent from the counter 22, and outputs a comparison detection signal which, as shown in FIG. 2F, is held at its L level until the count value from the counter 22 reaches the count value M of the first MONOS 23, and changes to its H level when the count value from the counter 22 reaches the count value M of the first MONOS 23. In the power management IC 11 according to the preferred embodiment of the present invention, when the comparison detection signal of the first comparator 26 goes to the H level, the comparison detection signal of H level is sent to the CPU 12 as a reset release signal. In other words, in the preferred embodiment of the present invention, when the comparison detection signal of the first comparator 26 goes to the H level, reset release of the CPU 12 is performed.

The second comparator 27 compares a count value N (N>M) stored in a second MONOS 24, which is a rewritable non-volatile memory, and the count value sent from the counter 22, and outputs a comparison detection signal which, as shown in FIG. 2G, is held at its L level until the count value from the counter 22 reaches the count value N of the second MONOS 24, and changes to its H level when the count value from the counter 22 reaches the count value N of the second MONOS 24. When the comparison detection signal of the second comparator 27 goes to the H level, the comparison detection signal of H level is sent to a second regulator 30 as a power-on signal.

When the power-on signal is supplied to the second regulator 30 from the second comparator 27 (when the comparison detection signal of the second comparator 27 goes to the H level), the second regulator 30 supplies I/O power of a predetermined voltage to the CPU 12 and the flash memory 13 as shown in FIG. 2H.

The third comparator 28 compares a count value O (O>N) stored in a third MONOS 25, which is a rewritable non-volatile memory, and the count value sent from the counter 22, and outputs a comparison detection signal which, as shown in FIG. 2I, is held at its L level until the count value from the counter 22 reaches the count value O of the third MONOS 25, and changes to its H level when the count value from the counter 22 reaches the count value O of the third MONOS 25. When the comparison detection signal of the third comparator 28 goes to the H level, the comparison detection signal of H level is sent to a third regulator 31 as a power-on signal.

When the power-on signal is supplied to the third regulator 31 from the third comparator 28 (when the comparison detection signal of the third comparator 28 goes to the H level), the third regulator 31 supplies I/O power of a predetermined voltage to the flash memory 13 as shown in FIG. 2J.

In the preferred embodiment of the present invention, each of the first MONOS 23, the second MONOS 24 and the third MONOS 25 is a non-volatile memory which data can be rewritten by injecting and ejecting electrons into and from the entire surface region under the gate electrode by tunnel current, or by using so-called hot carriers. The power management IC 11 according to the preferred embodiment of the present invention is configured so that the data of each of the first MONOS 23, the second MONOS 24 and the third MONOS 25 can be rewritten via a MONOS interface (I/F) 19.

Accordingly, in the power management IC 11 according to the preferred embodiment of the present invention, if the count value M stored in the 23 is rewritten into another desired value, the timing of reset release of the CPU 12 can be changed to another desired timing. If the count value N stored in the second MONOS 24 is rewritten into another desired value, the timing of I/O power supply to each of the CPU 12 and the flash memory 13 can be changed to another desired timing. If the count value O stored in the third MONOS 25 is rewritten into another desired value, the timing of supply of core power to the flash memory 13 can be changed to another desired timing.

In other words, in the power management IC 11 according to the preferred embodiment of the present invention, even if the specifications of the CPU 12 are modified and it is necessary to modify the timing of reset release of the CPU 12 and the timing of power-on of the corresponding ones of the regulators 29 to 31, or even if the specifications of the flash memory 13 are modified and it is necessary to modify the timing of power-on of the corresponding ones of the regulators 29 to 31, for example, it is possible to readily modify the timing of reset release of the CPU 12 and the timing of power-on of the regulators 29 to 31.

In the above description of the example of configuration shown in FIG. 1, reference has been made to the example in which the count values M, N and O which serve as comparison references in the respective first to third comparators 26 to 28 are stored in the first MONOS 23, second MONOS 24 and third MONOS 25, respectively. However, the counter setting values of a first variable counter, a second variable counter and a third variable counter may also be stored in the first MONOS 23, second MONOS 24 and third MONOS 25, respectively. In this case, the power management IC 11 may be configured so that the counter 22 shown in FIG. 1 is omitted and the respective first to third comparators 26 to 28 are replaced with the first to third variable counters, and so that the clocks of the RTC are supplied to the first to third variable counters and the counter setting values from the first MONOS 23, second MONOS 24 and third MONOS 25 are supplied to the respective first to third variable counters. In other words, in the case of this example, the first variable counter is configured to output a signal which goes to its H level when its count value reaches the count value M set by the first MONOS 23, the second variable counter is configured to output a signal which goes to its H level when its count value reaches the count value N set by the second MONOS 24, and the third variable counter is configured to output a signal which goes to its H level when its count value reaches the count value O set by the third MONOS 25.

[Example of Application of Power Management IC According to a Preferred Embodiment]

The power management IC 11 according to the preferred embodiment of the present invention can be applied to portable communications terminals and various other electronic apparatuses such as PDAs (Personal Digital Assistants) and digital cameras, portable and stationary television receivers, and personal computers, for example.

Figure 3:
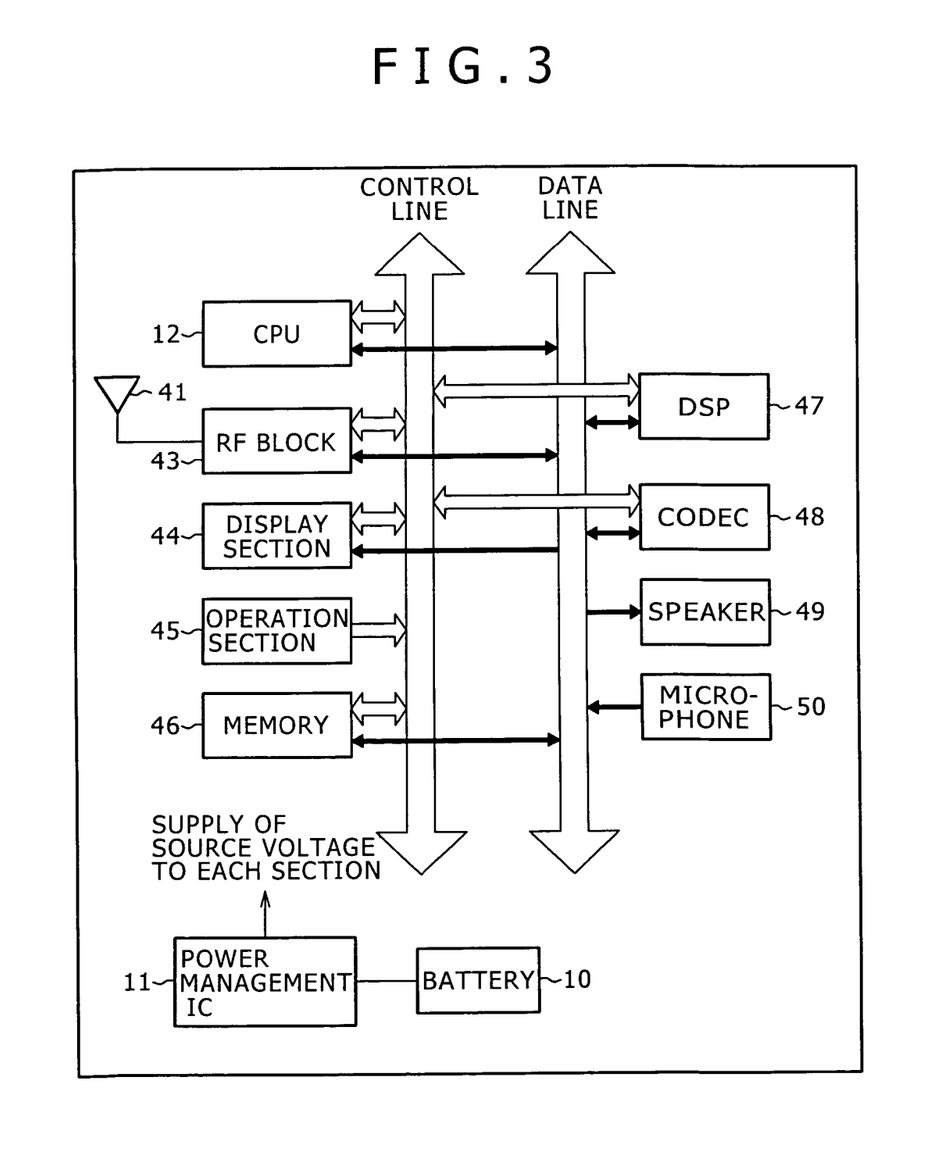
FIG. 3 is a block circuit diagram showing an example of configuration of main portions of a portable communications terminal in which the power management IC according to the preferred embodiment of the present invention is incorporated.

FIG. 3 shows a main internal configuration of a portable communications terminal in which the power management IC 11 according to the present embodiment is incorporated.

In FIG. 3, an antenna 41 is a built-in antenna, for example, and performs transmission and reception of radio wave signals. An RF block 43 is a communication circuit which performs wireless communication, and performs, for example, amplification and level adjustment of signals transmitted and received via the antenna 41, frequency conversion from RF to baseband, or frequency conversion from baseband to RF.

ADSP (Digital Signal Processor) 47 performs modulation and demodulation of signals, spectrum spread and inverse spectrum spread, and a decision as to whether transmitted/received data are call voice data or data other than call voice data, for example. The data other than call voice data may be image data, electronic mails, program data and various other kinds of data.

The received call voice data are sent to a codec 48 via a data line. The codec 48 decodes the call voice data, and sends the decoded voice data to a speaker 49 via the data line.

The speaker 49 includes a digital/analog converter and an amplifier, and performs digital-to-analog conversion and amplification of the voice data and outputs the obtained voice data, thereby reproducing a call voice.

On the other hand, the microphone 50 includes an analog/digital converter and an amplifier. A call voice signal inputted via this microphone 50 is amplified to a predetermined level by the amplifier and converted to digital voice data by the analog/digital converter. The digital voice data are sent to the codec 48 via the data line, and after having been encoded by the codec 48, are sent to the RF block 43 via the DSP 47.

A memory 46 includes a ROM and a RAM. The ROM stores, for example, control programs and various initial setting values which are necessary for the CPU 12 to control each section, the telephone number of the portable communications terminal, font data, dictionary data, program codes for various applications, and identification information (ID) for the portable communications terminal. This ROM includes a rewritable ROM such as an EEPROM, and is also capable of storing telephone directories and electronic mail addresses which are set by a user, image data and ring tone data, character data, and various other user setting values. The flash memory 13 shown in FIG. 1 may be included in the ROM. The RAM serves as a work area during various kinds of data processing, and stores data as needed.

A display section 44 includes, for example, a liquid crystal display and a drive circuit for displaying an image and the like on the display.

An operation section 45 has various keys and a jog dial which are disposed on the case of the portable communications terminal, and a key operation signal generation section which generates an operation signal corresponding to the operation of each of the keys and the jog dial.

The CPU 12 controls each constituent element of the portable communications terminal via a control line, and performs various arithmetic operations.

The power management IC 11 has the configuration shown in FIG. 1 mentioned previously, and supplies power to each section from the battery 10.

Although not shown, the portable communications terminal according to the present invention also includes a music recording and reproduction section for performing recording and reproduction of music, a browser function, an interface for providing connection between an external storage device such as an external memory and the terminal body, a connection terminal for an external remote controller, a short-distance wireless communication section for performing wireless communication (infrared communication and the like) of various kinds of information within a short distance, and a GPS (Global Positioning System) section which is a positioning device for detecting the current position of the portable communications terminal.

Figure 4:
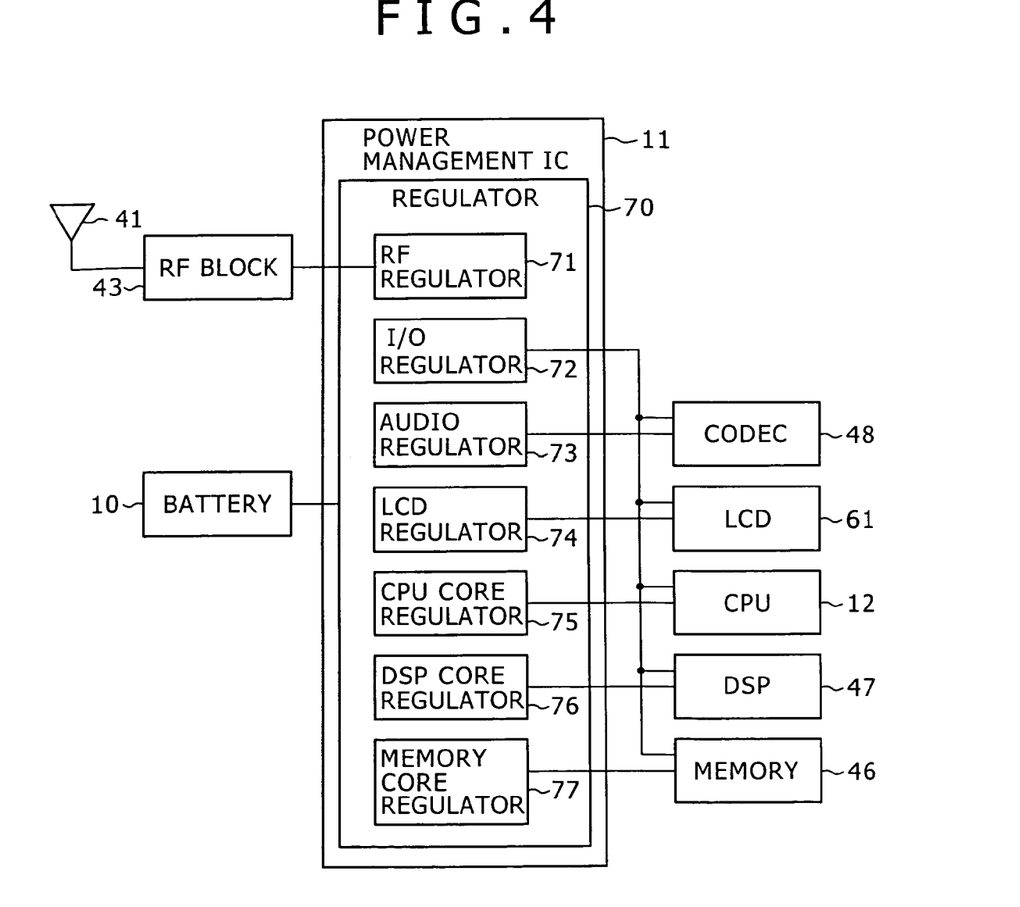
FIG. 4 is a block circuit diagram showing essential constituent elements each of which power is to be supplied to from the power management IC according to the preferred embodiment of the present invention, from among the constituent elements of the portable communications terminal according to the preferred embodiment of the present invention.

FIG. 4 shows essential constituent elements each of which power is to be supplied to from the power management IC 11 according to the preferred embodiment of the present invention, from among the constituent elements of the portable communications terminal which are shown in FIG. 3.

As shown in FIG. 4, in the portable communications terminal to which the power management IC 11 of the preferred embodiment of the present invention is applied, a regulator 70 incorporated in the power management IC 11 includes a CPU core regulator 76 for supplying core power to the CPU 12 (the first regulator 29 shown in FIG. 1), a memory core regulator 77 for supplying core power to the memory 46 (the third regulator 31 shown in FIG. 1), an RF regulator 71 for supplying power to the RF block 43, an audio regulator 73 for supplying power to the codec 48, an LCD regulator 74 for supplying power to an LCD 61 of the display section 44, and a DSP core regulator 76 for supplying core power to the DSP 47. An I/O power supply regulator 72 (the second regulator 30 shown in FIG. 1) supplies I/O power not only to the CPU 12 and the memory 46 but also to the LCD 61 and the DSP 47.

In addition, the power management IC 11 incorporated in the example shown in FIG. 4 includes MONOS's (not shown) each of which stores a value for setting the timing of power-on of a respective one of the regulators to the desired timing.

The above-mentioned examples of preferred embodiments constitute merely examples of preferred embodiments the present invention. Therefore, the present invention is not limited to the above-mentioned embodiments, and it will be obvious to those skilled in the art that various changes, modifications, combinations, sub combinations and alterations may be made depending on design requirements and other factors insofar as they are within the scope of the appended claims or equivalents thereof.

What is claimed is:

1. A power control apparatus comprising:
a detector for detecting start of power supply;
a timing determining unit for determining at least one of timing of CPU reset release and timing of I/O power supply to the CPU after the start of power supply is detected by the detector;
a rewritable non-volatile memory for storing a control values for controlling the timing determined by the timing determining unit; and
a rewriting interface for rewriting the control values stored in the non-volatile memory,
wherein the non-volatile memory stores as the control values a first count value for controlling the timing of reset release of the CPU and a second count value for controlling the timing of I/O power supply to the CPU;
the timing determining unit includes:
a counter for starting counting reference clocks after the start of power supply is detected by the detector;
a first comparator for comparing the first count value stored in the non-volatile memory and a count value output from the counter; and
a second comparator for comparing a second count value stored in the non-volatile memory and the count value output from the counter; wherein
the timing determining unit determines, as the timing of reset release of the CPU, a timing at which the first comparator detects matching between the first count value of the non-volatile memory and the count value of the counter, and to determine, as the timing of I/O power supply to the CPU, a timing at which the second comparator detects matching between the second count value of the non-volatile memory and the count value of the counter.

2. The power control apparatus according to claim 1, wherein the non-volatile memory is a MONOS-type memory.

3. An electronic apparatus comprising:
a CPU;
constituent elements having respective operations controlled by the CPU; and
a power control circuit including:
a detector which detects a start of power supply;
a timing determining unit which determines at least one of timing of reset release of the CPU and timing of I/O power supply to the CPU after the start of power supply is detected by the detector;
a rewritable non-volatile memory which stores control values for controlling the timing determined by the timing determining unit; and
a rewriting interface which rewrites the control values stored in the non-volatile memory,
wherein the non-volatile memory of the power control circuit stores as the control values a first count value for controlling the timing of reset release of the CPU and a second count value for controlling the timing of I/O power supply to the CPU; and
the timing determining unit of the power control circuit includes:
a counter which starts counting reference clocks after the start of power supply is detected by the detector;
a first comparator which compares the first count value stored in the non-volatile memory and a count value output from the counter; and
a second comparator which compares a second count value stored in the non-volatile memory and the count value output from the counter; wherein
the timing determining unit determines, as the timing of reset release of the CPU, a timing at which the first comparator detects matching between the first count value of the non-volatile memory and the count value of the counter, and to determine, as the timing of I/O power supply to the CPU, a timing at which the second comparator detects matching between the second count value of the non-volatile memory and the count value of the counter.

4. An electronic apparatus according to claim 3, wherein the non-volatile memory is a MONOS type memory.

5. A portable communications terminal comprising:
a communication circuit for performing wireless communication;
a CPU for performing control of at least wireless communications; and
a power control circuit including:
a detector for detecting a start of power supply;
a timing determining unit for determining at least one of timing of reset release of the CPU and timing of I/O power supply to the CPU after the start of power supply is detected by the detector;
a rewritable non-volatile memory for storing control values for controlling the timing determined by the timing determining unit; and
a rewriting interface for rewriting the control values stored in the non-volatile memory,
wherein the non-volatile memory of the power control circuit stores as the control values a first count value for controlling the timing of reset release of the CPU and a second count value for controlling the timing of I/O power supply to the CPU; and the timing determining unit of the power control circuit includes:
  a counter for starting counting reference clocks after the start of power supply is detected by the detector;
  a first comparator for comparing the first count value stored in the non-volatile memory and a count value output from the counter; and
  a second comparator for comparing a second count value stored in the non-volatile memory and the count value output from the counter; wherein
  the timing determining unit being operative to determine, as the timing of reset release of the CPU, a timing at which the first comparator detects matching between the first count value of the non-volatile memory and the count value of the counter, and to determine, as the timing of I/O power supply to the CPU, a timing at which the second comparator detects matching between the second count value of the non-volatile memory and the count value of the counter.

6. The portable communications terminal according to claim 5, wherein the non-volatile memory is a MONOS type memory.

7. A power control apparatus comprising:
detection means for detecting start of power supply;
timing determination means for determining at least one of timing of CPU reset release and timing of I/O power supply to the CPU after the start of power supply is detected by the detection means;
rewritable non-volatile storage means for storing control values for controlling the timing determined by the timing determination means; and
rewriting interface means for rewriting the control values stored in the non-volatile storage means,
wherein the non-volatile storage means stores as the control values a first count value for controlling the timing of reset release of the CPU and a second count value for controlling the timing of I/O power supply to the CPU;
the timing determination means includes:
  counting means for starting counting reference clocks after the start of power supply is detected by the detection means;
  first comparison means for comparing the first count value stored in the non-volatile storage means and a count value output from the counting means; and
  second comparison means for comparing a second count value stored in the non-volatile storage means and the count value output from the counting means;
wherein
  the timing determination means determines, as the timing of reset release of the CPU, a timing at which the first comparison means detects matching between the first count value of the non-volatile storage means and the count value of the counting means, and to determine, as the timing of I/O power supply to the CPU, a timing at which the second comparison means detects matching between the second count value of the non-volatile storage means and the count value of the counting means.

8. An electronic apparatus comprising:
a CPU;
constituent elements whose respective operations are controlled by the CPU; and
a power control circuit including:
  a detection means for detecting start of power supply;
  a timing determination means for determining at least one of timing of reset release of the CPU and timing of I/O power supply to the CPU after the start of power supply is detected by the detection means;
  a rewritable non-volatile storage means for storing control values for controlling the timing determined by the timing determination means; and
  a rewriting interface means for rewriting the control values stored in the non-volatile storage means,
wherein the rewritable non-volatile storage means stores as the control values a first count value for controlling the timing of reset release of the CPU and a second count value for controlling the timing of I/O power supply to the CPU;
the timing determination means includes:
  counting means for starting counting reference clocks after the start of power supply is detected by the detection means;
  first comparison means for comparing the first count value stored in the rewritable non-volatile storage means and a count value output from the counting means; and
  second comparison means for comparing a second count value stored in the rewritable non-volatile storage means and the count value output from the counting means; wherein
  the timing determination means determines, as the timing of reset release of the CPU, a timing at which the first comparison means detects matching between the first count value of the rewritable non-volatile storage means and the count value of the counting means, and to determine, as the timing of I/O power supply to the CPU, a timing at which the second comparison means detects matching between the second count value of the non-volatile storage means and the count value of the counting means.

9. A portable communications terminal comprising:
communication means for performing wireless communication;
a CPU for performing control of at least wireless communications; and
a power control circuit including:
  a detection means for detecting start of power supply;
  a timing determination means for determining at least one of timing of reset release of the CPU and timing of I/O power supply to the CPU after the start of power supply is detected by the detection means;
  a rewritable non-volatile storage means for storing control values for controlling the timing determined by the timing determination means; and
  a rewriting interface means for rewriting the control values stored in the non-volatile storage means,
wherein the rewritable non-volatile storage means stores as the control values a first count value for controlling the timing of reset release of the CPU and a second count value for controlling the timing of I/O power supply to the CPU;
the timing determination means includes:
  counting means for starting counting reference clocks after the start of power supply is detected by the detection means;
  first comparison means for comparing the first count value stored in the rewritable non-volatile storage means and a count value output from the counting means; and
  second comparison means for comparing a second count value stored in the rewritable non-volatile storage means and the count value output from the counting means; wherein the timing determination means determines, as the timing of reset release of the CPU, a timing at which the first comparison means detects matching between the first count value of the non-volatile storage means and the count value of the counting means, and to determine, as the timing of I/O power supply to the CPU, a timing at which the second comparison means detects matching between the second count value of the rewritable non-volatile storage means and the count value of the counting means.

10. A power control apparatus comprising:

a detector configured to detect a start of a power supply;

a timing determining unit configured to determine a timing of a CPU reset release and configured to determine a timing of a I/O power supply to the CPU after the start of the power supply is detected by the detector;

a rewritable non-volatile memory storing control values used to control the timing determined by the timing determining unit, the control values including a first count value to control the timing of the CPU reset release, and a second count value to control the timing of I/O power supply to the CPU; and a rewriting interface configured to rewrite the control values stored in the non-volatile memory, wherein the non-volatile memory is a MONOS-type memory.

11. An electronic apparatus comprising:

a detector configured to detect a start of a power supplying unit;

a timing determining unit configured to determine a timing of a CPU reset release and configured to determine a timing of a I/O power supply to the CPU after the start of the power supplying unit is detected by the detector;

a rewritable non-volatile memory storing control values used to control the timing determined by the timing determining unit, the control values including a first count value to control the timing of the CPU reset release, and a second count value to control the timing of I/O power supply to the CPU; and a rewriting interface configured to rewrite the control values stored in the non-volatile memory, wherein the non-volatile memory is a MONOS-type memory.

12. An electronic means comprising:

a detecting means for detecting a start of a power supplying means;

a timing determining means for determining a timing of a CPU reset release and configured to determine a timing of a I/O power supply to the CPU after the start of the power supplying means is detected by the detecting means;

a rewritable non-volatile memory means storing control values used to control the timing determined by the timing determining means, the control values including a first count value to control the timing of the CPU reset release, and a second count value to control the timing of I/O power supply to the CPU; and a rewriting interface means for rewriting the control values stored in the non-volatile memory means, wherein the non-volatile memory means is a MONOS-type memory.

13. A portable communications terminal comprising:

a detector configured to detect a start of a power supplying unit;

a timing determining unit configured to determine a timing of a CPU reset release and configured to determine a timing of a I/O power supply to the CPU after the start of the power supplying unit is detected by the detector;

a rewritable non-volatile memory storing control values used to control the timing determined by the timing determining unit, the control values including a first count value to control the timing of the CPU reset release, and a second count value to control the timing of I/O power supply to the CPU; and a rewriting interface configured to rewrite the control values stored in the non-volatile memory, wherein the non-volatile memory is a MONOS-type memory.

14. An portable communications terminal means comprising:

a detecting means for detecting a start of a power supplying means;

a timing determining means for determining a timing of a CPU reset release and configured to determine a timing of a I/O power supply to the CPU after the start of the power supplying means is detected by the detecting means;

a rewritable non-volatile memory means storing control values used to control the timing determined by the timing determining means, the control values including a first count value to control the timing of the CPU reset release, and a second count value to control the timing of I/O power supply to the CPU; and a rewriting interface means for rewriting the control values stored in the non-volatile memory means, wherein the non-volatile memory means is a MONOS-type memory.

15. A power control means comprising:

a detecting means for detecting a start of a power supplying means;

a timing determining means for determining a timing of a CPU reset release and configured to determine a timing of a I/O power supply to the CPU after the start of the power supplying means is detected by the detecting means;

a rewritable non-volatile memory means storing control values used to control the timing determined by the timing determining means, the control values including a first count value to control the timing of the CPU reset release, and a second count value to control the timing of I/O power supply to the CPU; and a rewriting interface means for rewriting the control values stored in the non-volatile memory means, wherein the non-volatile memory means is a MONOS-type memory.

* * * * *